Aug. 22, 1944.           E. H. LAND                 2,356,250
                          ADHESIVE
                    Filed Dec. 4, 1937
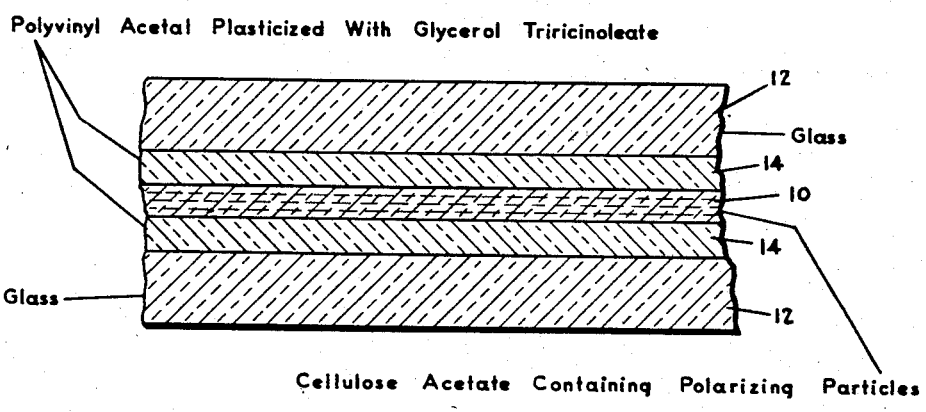
INVENTOR.
Edwin H. Land
BY Brown & Jones
   Attorneys Patented Aug. 22, 1944

2,356,250

UNITED STATES PATENT OFFICE 2,356,250

ADHESIVE

Edwin H. Land, Wellesley Farms, Mass., assignor, by mesne assignments, to Polaroid Corporation, Dover, Del., a corporation of Delaware Application December 4, 1937, Serial No. 178,153

8 Claims. (Cl. 88—65)

This invention relates to a new and improved adhesive, and more particularly to an adhesive adapted to effect a firm bond between cellulose acetate and glass or between sheets or films of cellulose acetate.

An object of the invention is to provide an adhesive of the character described comprising a mixture of vinyl acetal and triricinoleate of glycerine.

A further object of the invention is to provide an adhesive of the character described which is adapted to effect a firm bond between sheets of the light-polarizing material sold under the trade name "Polaroid" and cellulose acetate or glass.

Other objects of the invention are to provide a lamination of the materials described which is resistant to a high degree of humidity and which is substantially unaffected by ultra violet radiation.

Other objects of the invention will in part be obvious and will in part appear hereinafter.

The invention accordingly comprises a product possessing the features, properties, and the relation of components which will be exemplified in the product hereinafter described and the scope of the application of which will be indicated in the claims.

For a further understanding of the invention, reference should be had to the accompanying drawing, which is a partial view in vertical section showing a device embodying a form of the invention.

It is frequently desirable to laminate or cement together sheets or films comprising cellulose acetate, or to effect a lamination or bond between such a sheet and a plate of glass. For example, a material now sold under the trade name "Polaroid" and which is available in thin, sheet-like form, comprises a suspension of minute, needle-shaped polarizing crystals in a suspending medium comprising cellulose acetate. This material has a wide range of uses. It may be employed in photography, in advertising, in the elimination of automobile headlight glare, in scientific instruments employing polarized light, in viewing devices, sun-glasses, glare shields, and many other fields of activity. In most of these uses it is highly desirable that the material be cemented to a transparent rigid support, such for example as a sheet of glass, or to a heavier, more rigid sheet of cellulose acetate or other synthetic resin.

In many of the uses to which the above material is applied it is subjected to relatively intense illumination. It may, for example, be interposed between a light source and a surface to be viewed, and the source may be intense and may emit a high percentage of ultra violet radiation. If said material is to be laminated to glass or to another supporting film or sheet, the cement or adhesive employed to effect the lamination should be unaffected by ultra violet radiation.

In other uses said polarizing material is subjected to the action of humid atmospheres. For example, in sunglasses, ski-glasses and the like, the product may be carried close to the body of the user when not in use, or it may even be used in snow or rain, so that unless the lamination is carefully shielded, it may come in contact with a humid atmosphere. Under these circumstances the adhesive or cement employed should be highly resistant to such an atmosphere.

This invention contemplates the provision of an adhesive or cement comprising a mixture of a polyvinyl acetal resin, such for example as the material sold under the trade-name "Vinylite X," with an ester of ricinoleic acid, and more specifically with glycerol triricinoleate in the proportions hereinafter specified, for use in connection with the lamination of sheets or films of cellulose acetate or material comprising cellulose acetate to other sheets or films of the same or similar material or other synthetic resin or plastic or to glass. An example of a product embodying a form of the invention is shown in the drawing and comprises a sheet 10 of the above-mentioned polarizing material bonded between two sheets 12 of glass by two layers 14 of the adhesive material of the present invention.

An adhesive of the character described has been found highly resistant to ultra violet radiation. For example, it is substantially unaffected, when used as the laminating material between sheets of polarizing material and glass or polarizing material and cellulose acetate, when the lamination is exposed to the direct rays of a 150-watt photo-flood bulb for a thousand hours at a distance of one foot from the bulb.

Furthermore, an adhesive of the character described has been found highly resistant to moisture and has been found to provide an excellent bond or adhesion between adjacent sheets or films of the laminated material.

The adhesive will furthermore withstand relatively high temperatures without decomposition or discoloration.

A preferred composition for the adhesive of the present invention is one consisting of substantially equal parts of a polymerized polyvinyl acetal resin and glycerol triricinoleate. These proportions may, however, be varied within relatively wide ranges without departing from the invention and without substantially impairing the properties of the product. The polyvinyl acetal resin may comprise, for example, from 25% to 75% of the adhesive and the glycerol triricinoleate may comprise from 75% to 25% thereof.

The glycerol triricinoleate is available commercially as raw castor oil, and it is to be understood that such castor oil may be employed in the invention in lieu of the pure compound and in the same proportions.

The adhesive may be prepared by mixing the two materials specified as by heating, or otherwise, for example in the presence of any suitable solvent, of which there are a large number, and it may then be applied between the sheets or films to be laminated by preparing thin films of the adhesive which may be placed between the other elements of the lamination, and the whole then subjected to pressure, or the adhesive may be rendered less viscous by the addition of a suitable quantity of solvent, and may be flowed between the two sheets or films to be laminated and pressure then applied.

It will be obvious that the addition of other inert material to the adhesive mixture, such as a pigment, or filler, or other plasticizer is contemplated, and the product so formed is to be understood as falling within the scope of the invention.

While the resin employed in the adhesive has been described as a vinyl acetal resin or as a polyvinyl acetal resin, it is to be understood that a preferred resin for use in the product of the invention is one such as is described in the patent to Fix, No. 2,045,130, as used with a dihexoate plasticizer in the formation of safety glass lamination, and which is therein described as a polymerized incomplete poly-vinyl acetal resin obtained by reacting from 2.5 to 8 mols of polyvinyl alcohol with 1 mol. of a straight chain (saturated) aliphatic aldehyde, such as butyraldehyde. In this connection it should be pointed out that the adhesive comprising the polyvinyl acetal resin and the dihexoate plasticizer described in the Fix patent is not satisfactory for the purposes for which the adhesive of the present invention is to be used.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A laminated article of manufacture comprising a substantially rigid light-transmitting sheet and a sheet comprising cellulose acetate cemented together by a thin film of a mixture of a polymerized incomplete polyvinyl acetal resin and glycerol triricinoleate.

2. A lamination comprising a sheet of glass cemented to a sheet comprising cellulose acetate by an adhesive comprising a polymerized incomplete polyvinyl acetal resin mixed with glycerol triricinoleate.

3. A lamination comprising a sheet of glass cemented to a sheet comprising cellulose acetate by an adhesive comprising a polymerized incomplete polyvinyl acetal resin mixed with glycerol triricinoleate in substantially equal proportions.

4. A lamination comprising a plurality of layers of materials comprising cellulose acetate adhesively united by a thin film of a mixture of a polymerized incomplete polyvinyl acetal resin and glycerol triricinoleate.

5. A lamination comprising a plurality of layers of materials comprising cellulose acetate adhesively united by a thin film of a mixture of a polymerized incomplete polyvinyl acetal resin and glycerol triricinoleate in substantially equal proportions.

6. A lamination comprising a light-transmitting supporting element and a sheet comprising cellulose acetate cemented together by an adhesive substantially unaffected by ultra violet radiation and comprising a polymerized incomplete polyvinyl acetal resin and glycerol triricinoleate.

7. In combination, a transparent, substantially rigid supporting element and a sheet of light polarizing material comprising cellulose acetate having dispersed therein a multitude of polarizing particles, said element and sheet being cemented together by an adhesive comprising a polymerized incomplete polyvinyl acetal resin and glycerol triricinoleate.

8. In combination, a transparent, substantially rigid supporting element and a sheet of light polarizing material comprising cellulose acetate having dispersed therein a multitude of polarizing particles, said element and sheet being cemented together by an adhesive comprising substantially equal parts of a polymerized incomplete polyvinyl acetal resin and glycerol triricinoleate.

EDWIN H. LAND.